March 10, 1931.  E. W. SUNKENBERG  1,795,321
SUPPORTING AND/OR ILLUMINATING DEVICE
Filed June 14, 1929
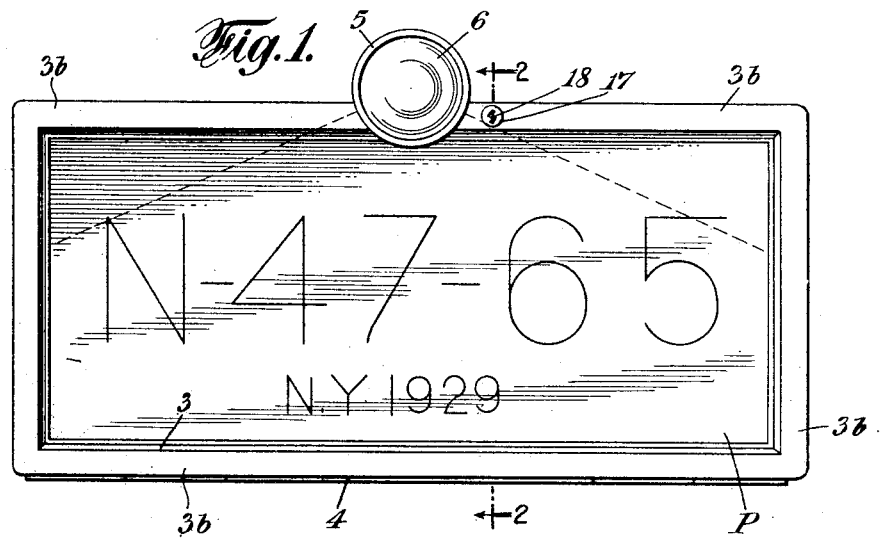
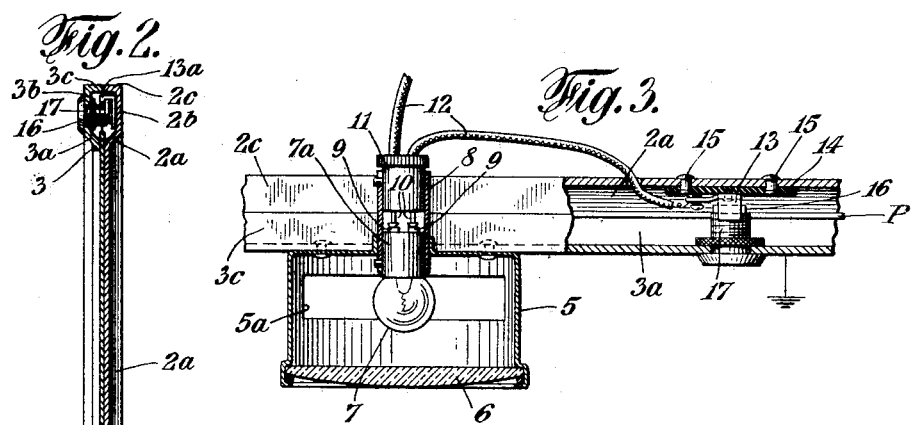
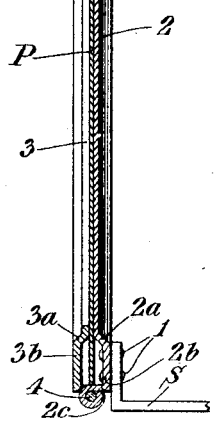
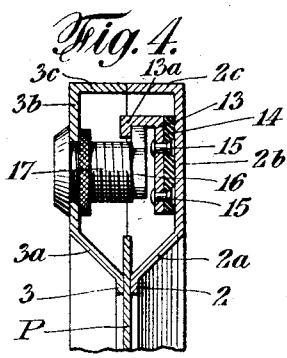
INVENTOR
Edward W. Sunkenberg.
BY
Ward, Crosby & Neal.
his ATTORNEYS Patented Mar. 10, 1931

1,795,321

UNITED STATES PATENT OFFICE

EDWARD W. SUNKENBERG, OF HOHOKUS, NEW JERSEY

SUPPORTING AND/OR ILLUMINATING DEVICE

Application filed June 14, 1929. Serial No. 370,782.

My invention relates to a device or mechanism for supporting in a desired position an article or object, such as an ordinary automobile identification or license plate.

My invention, in one of its prominent phases, relates to a device or mechanism, as aforesaid, embodying a lock structure which controls illumination of a license plate and which also prevents casual unauthorized removal thereof from said device or mechanism.

My invention resides in a supporting device of simple construction, and in one that is readily manufactured and extremely simple to operate.

Further objects, advantages and characteristics of my invention will become apparent from the following detailed description taken in connection with the accompanying drawing.

My invention resides in the device or mechanism, features of construction and combination of parts of the character hereinafter described and claimed.

For an illustration of one of the many forms my invention may take, reference is to be had to the accompanying drawing, in which:

Figure 1 is a side elevational view of a supporting device as constructed in accordance with one form of my invention;

Fig. 2 is a transverse vertical sectional view, partly in elevation, and is taken on the line 2—2 of Fig. 1 looking in the direction of the arrows, parts being omitted;

Fig. 3 is an enlarged, fragmentary plan view, partly in horizontal section, of the device shown on Fig. 1; and Fig. 4 is an enlarged, transverse vertical sectional view showing a modified form of my invention.

Referring to the drawings, S represents any suitable member, bracket or support positioned, for example, at the rear of an automobile. Suitably secured to the support S, as by rivets 1, or equivalent, is a member 2 which, as shown and preferably, is of substantially rectangular configuration. In the form of my invention herein illustrated, the member 2, adjacent the periphery thereof, comprises a section 2a angularly related to the general plane of member 2, said section 2a merging into a section 2b disposed substantially parallel with the general plane of member 2, said section 2b, in turn, merging into a flanged section 2c disposed substantially at right angles to the general plane of member 2.

A second member 3 coacts with the aforesaid member 2 to detachably retain or support a license plate P in a desired position. As illustrated particularly in Fig. 2, the member 3 comprises sections 3a, 3b, and 3c corresponding with the respective sections 2a, 2b and 2c of member 2. The member 3 is apertured or cut away to an extent less than the area of the plate P and preferably, as illustrated in Fig. 1 to thereby permit observation of the identifying characters or indicia on said plate P which, of course, should be so positioned that the aforesaid characters or indicia face in the proper direction to permit observation thereof from the rear of the automobile in the example shown.

In accordance with my invention, the members 2 and 3 are so mounted that they are movable with respect to each other whereby the license plate P may readily be associated therewith or disassociated therefrom. In the form of my invention herein illustrated, the member 3 is hinged or pivoted to the member 2 and, for this purpose, there may be utilized, if desired, a pin or rod 4 passing through alined ears carried, respectively, by the members 2 and 3.

To the end that the characters or indicia on the plate P may be illuminated, the aforesaid member 3, particularly the section 3b thereof, may carry a suitable lamp casing 5 closed at one end thereof by a sheet of glass 6 colored red as usual. The lamp casing 5, further, may comprise a light-passing slot or passage 5a through which light passes from an incandescent electric lamp 7, the base 7a of which is detachably retained in a socket 8 in any suitable manner. As illustrated, the base 7a of lamp 7 may carry contacts 9 coactable, respectively, with contacts 10 carried by a plug 11 detachably supported in and by the socket 8, said contacts 10 forming the terminals of the respective electrical conductors 12, 12. In the form of my invention herein illustrated, one conductor 12 leads to a suitable control switch, not shown, and thence to one terminal of the automobile battery. The other conductor 12 extends into an inaccessible space formed partly by and between the sections 2b and 3b of the respective members 2 and 3 when the latter are positioned as illustrated on the drawing; in this space, said last named conductor 12 is suitably connected to a metallic member 13 forming a terminal for said last named conductor 12 and also forming an element of locking mechanism, as hereinafter more fully described. Member 13 is carried by the section 2b of member 2 but is suitably insulated therefrom since the latter is connected to one terminal of the automobile battery, as hereinafter described. To this end, the member 13 may be secured directly to a member 14 formed of suitable insulating material, as hard rubber, said member 14 being suitably secured to the aforesaid section 2b of member 2, as by rivets 15 or the like, other rivets 15, or equivalent, securing the members 13 and 14 together, said last named rivets 15 being spaced from or otherwise suitably insulated from the member 2.

As stated, member 13 forms one element of suitable locking mechanism and, accordingly, said member 13 may comprise an overhanging ledge 13a with which coacts a locking member 16 suitably mounted for oscillatory movement in a tubular member or barrel 17 carried by and extending through the section 3b of member 3, said locking member 16 being operable upon operation of a key into a key slot 18, Fig. 1, extending interiorly of said member 17.

With the various parts positioned as illustrated on the drawing, the locking member 16 coacts with the flange 13a of member 13 to positively retain the members 2 and 3 in closed position, i. e. in such position that they form a pocket for the plate P and, ordinarily to some extent at least, grip the same particularly adjacent the periphery thereof. Under such circumstances, the proper key may be inserted in the slot 18 and operated to separate the locking member 16 from the flange 13a. Thereupon, the member 3 may be swung with respect to the member 2 and the plate P removed. This would be done, for example, by the owner of the automobile at the end of the year when it became necessary to change plates.

In the absence of the proper key, the plate P could be removed only by mutilating some of the parts and, in any event, a different plate could be substituted only with great difficulty. Thus, should be automobile be stolen, it would probably be necessary for it to be operated with the proper license plates which, of course, would aid detection. If another plate was to be substituted, it would be necessary to mount it outside of the device comprising the members 2 and 3 or said members 2 and 3 would be mutilated to effect the substitution. In either case, there would be distinct evidence of tampering whereby the liability of detection would be increased greatly.

In the form of my invention herein illustrated, the hereinbefore described member, bracket or support S forms a part of the metallic frame of the automobile to which, as well understood, one terminal of the automobile battery is connected. The members 2 and 3 are constructed of metallic material; hence the lock mechanism and particularly the member 16 thereof are connected to the last named battery terminal.

Accordingly, with the various parts positioned as illustrated on the drawing that is, with the locking member 16 coacting with the flange 13a of member 13, the circuit through the conductors 12, 12 is completed and the lamp 7 is energized provided that its control switch, not shown, is properly operated. Therefore, in accordance with my invention, the herein described lock mechanism serves a dual purpose, namely, as a positive closure for a license plate supporting device and as a control switch for the lamp effecting illumination of the characters on said license plate. Should the lock mechanism be mutilated or destroyed, for example, when attempting to remove the proper plate P without a key, the lamp 7 will, in all probability, become non-energizable. This, of course, may be remedied by otherwise connecting the proper conductor 12 to some other part of the automobile frame. However, such an expedient is unsatisfactory and the time which must necessarily be consumed to arrange the connection aids the chances of theft detection. Of course, the foregoing has no application in the day time but is important at night because deenergization of the rear lamp 7 inevitably precipitates a warning from a traffic officer.

It shall be distinctly understood that my invention is not to be limited to the utilization of the automobile frame as a conductor to one terminal of the battery. As well, the conductor 12, 12 may be connected to the respective battery terminals independently of the aforesaid frame.

In Fig. 4, I have illustrated a form of my invention wherein the member 3 is shown as corresponding with the hereinbefore described member 3. In Fig. 4, however, the member 2 is shown as cut away or apertured, as is the member 3 or otherwise as may be desirable. Accordingly with the form of my invention illustrated in Fig. 4, the plate P is substantially free of support throughout the major area thereof and is only peripherally supported.

Although, the peripheral construction of the members 2 and 3, the same comprising the sections 2a, 2b, 2c, 3a, 3b and 3c is a desirable way of shaping said members, it shall be understood that my invention is not to be so limited. The aforesaid sections cause the members 2 and 3 to form a substantially closed chamber immediately adjacent their peripheries when said members 2 and 3 are closed. It is desirable that the locking mechanism and the contact associated therewith be suitably housed or enclosed when the lock is operated to positively retain the plate P in its desired position. However, it shall be understood that such a housing or chamber may be quite different from that herein illustrated and described.

Although I have illustrated my invention in connection with the license plate for the rear of an automobile, it shall be understood that, as well, the front license plate may be supported by a device constructed in accordance with my invention. This follows because in some important aspects, my invention involves the members 2 and 3 together with the locking mechanism therefor and is independent of the lamp, lamp casing or any electrical circuit connections whatsoever. Under such circumstances, the locking mechanism functions solely as a device for retaining the members 2 and 3 in closed position.

It shall also be understood that locking mechanism of a variety of types, specifically different from that herein disclosed, may be utilized. Furthermore, when said locking mechanism is associated with a switch device, the latter may be of any suitable character specifically different, if desired, from that herein disclosed.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A supporting device for a license plate having characters on one face thereof, said device comprising coacting members hinged to each other, said members, respectively, comprising angular sections extending toward each other in gripping relation with respect to opposite sides of said license plate, and means for retaining said members in position forming a pocket for said plate.

2. In combination, a supporting device for an indicia-bearing license plate, said device comprising coacting members hinged to each other, a lock for retaining said members in predetermined position to thereby prevent unauthorized removal of said license plate, and an incandescent electric lamp for illuminating the indicia on said license plate, said lock when in one position retaining said members in closed position and closing the circuit through said lamp, said lock in another position releasing said members and opening the circuit through said lamp.

3. In combination, a supporting device for an indicia-bearing license plate, said device comprising coacting members hinged to each other, a lock for retaining said members in predetermined position to thereby prevent unauthorized removal of said license plate, and an incandescent electric lamp for illuminating the indicia on said license plate, a part of said lock being carried by one of said members and associated therewith in electricity-conducting relation, another part of said lock being carried by the other of said members and insulated therefrom.

4. In combination, a supporting device for an indicia-bearing license plate, said device comprising coacting members hinged to each other, a lock for retaining said members in predetermined position to thereby prevent unauthorized removal of said license plate, and an incandescent electric lamp for illuminating the indicia on said license plate, said lock controlling energization of said electric lamp.

5. In combination, a supporting device for an indicia-bearing license plate, said device comprising coacting members hinged to each other, a lock for retaining said members in predetermined position to thereby prevent unauthorized removal of said license plate, a casing carried by one of said members, and an incandescent electric lamp in said casing for illuminating the indicia on said license plate, said lock controlling energization of said electric lamp.

6. In combination, a supporting device for an indicia-bearing license plate, said device comprising coacting members hinged to each other, a lock for retaining said members in predetermined position to thereby prevent unauthorized removal of said license plate, said members when in said position defining an inaccessible space, a casing carried by one of said members, an incandescent electric lamp in said casing for illuminating the indicia on said license plate, and means for energizing said lamp, said last named means comprising a conductor terminating in said space, said lock comprising a contact member coactable with said conductor and controlling energization of said lamp.

7. In combination, a supporting device for an indicia-bearing license plate, said device comprising coacting members hinged to each other, a lock for retaining said members in predetermined position to thereby prevent unauthorized removal of said license plate, said lock comprising an oscillatory latching element, said members when in said position defining an inaccessible space, a casing carried by one of said members, an incandescent electric lamp in said casing for illuminating the indicia on said license plate, and means for energizing said lamp, said last named means comprising a conductor terminating in a contact positioned in said space, the latching element of said lock coacting with said contact to open or close the circuit through said lamp.

8. In combination, a supporting device for an indicia-bearing license plate, said device comprising coacting members hinged to each other, a lamp casing carried by one of said members, an electric lamp in said casing for illuminating the indicia on said license plate, and locking mechanism for said device, said mechanism comprising elements carried by and movable with each of said members.

In testimony whereof I have signed my name to this specification.

EDWARD W. SUNKENBERG.